United States Patent [19]

Panandiker et al.

[11] 4,395,529

[45] Jul. 26, 1983

[54] COATING POWDERS FOR PROTECTIVE FILMS BASED ON EPSILON-CAPROLACTAM BLOCKED ISOCYANATES

[75] Inventors: K. A. Pai Panandiker, Maple Grove; Charles Danick, Plymouth, both of Minn.

[73] Assignee: Cargill, Incorporated, Minneapolis, Minn.

[21] Appl. No.: 285,353

[22] Filed: Jul. 20, 1981

[51] Int. Cl.$^3$ .................... C08G 18/80; C08G 18/75
[52] U.S. Cl. .................................... 528/45; 528/67; 528/81
[58] Field of Search .................................. 528/45, 67

[56] References Cited

U.S. PATENT DOCUMENTS

| | | | |
|---|---|---|---|
| 3,819,586 | 6/1974 | Rudolph et al. | 260/77.5 |
| 3,822,240 | 7/1974 | Schmitt et al. | 260/75 |
| 3,849,160 | 11/1974 | Dhein et al. | 117/17 |
| 3,931,117 | 1/1976 | Leonard | 260/75 |
| 4,150,211 | 4/1979 | Mueller et al. | 528/45 |
| 4,171,305 | 10/1979 | Mochizuki | 528/45 |
| 4,212,962 | 7/1980 | Schmitt et al. | 528/45 |
| 4,238,592 | 12/1980 | Schmitt et al. | 528/45 |
| 4,246,380 | 1/1981 | Gras et al. | 528/45 |

OTHER PUBLICATIONS

J. Oil & Color Chemist Assoc., Feb. 1982, p. 75.

*Primary Examiner*—H. S. Cockeran
*Attorney, Agent, or Firm*—Fitch, Even, Tabin & Flannery

[57] ABSTRACT

This invention describes a coating composition and method for producing such composition wherein the composition includes an E-caprolactam blocked polyisocyanate including a diisocyanate selected from the group consisting of 1,4-bis (isocyanatomethyl) cyclohexane and 1,3-bis (isocyanatomethyl) cyclohexane; and a film forming hydroxy containing organic polymer.

8 Claims, No Drawings

COATING POWDERS FOR PROTECTIVE FILMS BASED ON EPSILON-CAPROLACTAM BLOCKED ISOCYANATES

The present invention relates to novel coating powders for use in the preparation of protective films and paints. More particularly, the present invention relates to improved coating powders that are conveniently handled, require lower amounts of curing agent, have lower temperature cure schedules, and provide excellent flow of the finished coating without sacrificing stability.

Powder coatings have been widely used. Early, polyurethane coating systems involved isocyanate-terminated prepolymers that were cured by the reaction of the free isocyanate group with water or moisture in the atmosphere. Later "blocked" isocyanates began to be used in coating systems. Polyisocyanates were "blocked" by reacting them with mono-functional compounds (which comprised the blocking compounds) to yield products which did not react with hydroxy containing compounds at room temperature. At elevated temperatures, however, the blocking group was eliminated causing regeneration of the isocyanate group which was then available for cross-linking in a usual and known manner. At first phenols were widely used as blocking compounds. Phenols, however, are quite toxic and pose a health hazard to the environment.

Still later, as mentioned in U.S. Pat. No. 3,931,117 to Leonard and in U.S. Pat. No. 3,819,586 to Rudolph et al., it was discovered that particular diisocyanates could be blocked with Epsilon-caprolactam. Each of the aforedescribed Letters Patent discussed blocking diisocyanates or polyisocyanates with E-caprolactam, and mixing the product with a polyol to produce a coating which would cross-link upon heating. Heating would cause the blocking compound to be eliminated which would permit the isocyanate to react with the polyol. The disadvantages of these compounds are that they are based upon isophorone diisocyanate which has a higher molecular weight as compared to the compounds in the invention, 1,4-bis(isocyanatomethyl)cyclohexane and 1,3-bis(isocyanatomethyl)cyclohexane, and require higher temperatures for deblocking.

A need exists, therefore, for a light stable polyester urethane coating which requires a low amount of polyisocyanate for a given hydroxyl value, which gives low temperature cures, and which provides desired flow properties for the finished coating without sacrificing paint stability.

The present invention provides a composition for use in the preparation of protective films which comprises a mixture of a hydroxy containing polyester with an E-caprolactam-blocked organic polyisocyanate prepolymer component based upon 1,4-bis(isocyanatomethyl)-cyclohexane (1,4 BIC), having the structure

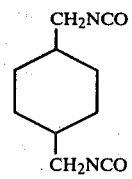

and/or 1,3bis(isocyantomethyl)cyclohexane known as 1,3 BIC, having the structure

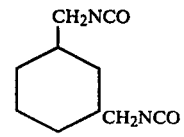

The E-caprolactam-blocked organic polyisocyanate prepolymer component is prepared from the reaction of E-caprolactam, the latter aliphatic diisocyanates and polyhydric alcohols. The blocked polyisocyanate prepolymer component, which comprises from a 1:0 to 1:1.5 molar mixture of E-caprolactam blocked polyisocyanate and E-caprolactam blocked diisocyanate, is then mixed with hydroxy containing polyesters to provide a powdered coating composition which can be cured into a protective film upon heating. The new coating composition has improved film properties over coating compositions known in the prior art, and requires less blocked polyisocyanate curing agent than known curing agents based upon aliphatic isocyanates.

A blocked polyisocyanate component based upon 1,4 BIC and 1,3 BIC as a curing agent for powder coatings may be prepared by reacting from about 3.0 to about 4.5 moles of the latter diisocyanates; about 1.0 mole of polyhydric alcohols per mole of isocyanate group, such as trimethylol propane, trimethylol ethane, glycerine, and E-caprolactone; and about 3.0 to about 6.0 moles of E-caprolactam. The blocked polyisocyanate component then is mixed with hydroxy terminated polyesters to produce powder coatings which are cross-linked upon curing with heat. The polyisocyanate component, depending upon the stoichiometric quantity of E-caprolactam and diisocyanate, will comprise varying amounts of E-caprolactam blocked polyisocyanate with E-caprolactam blocked diisocyanate. The polyisocyanate component comprises from about 1:0 to about 1:1.5 molar mixture of E-caprolactam blocked polyisocyanate and E-caprolactam blocked diisocyanate. A slight excess of diisocyanate 1,4 BIC or 1,3 BIC is preferred. The polyisocyanate may be prepared in a batch process and then blocked, or a blocked polyisocyanate component may be prepared in a "one shot" process. The batch process differs from the "one shot" or continuous process by the way the product is synthesized in stages rather than all at once. In the batch process, first the polymer of the diisocyanate and polyhydric alcohol such as trimethylol propane, or hydroxy containing polyol is made, and then the blocking or capping agent, E-caprolactam, is added to the polyisocyanate to block it. Further, a reverse addition process also can be used wherein the diisocyanate is reacted with E-caprolactam which is followed by the addition of the polyhydric alcohol.

When 1,4 BIC or 1,3 BIC is reacted with trimethylol propane and E-caprolactam, the preferred blocked isocyanate product is 78% to 87% by weight polyisocyanate, 13% to 22% by weight diisocyanate, has free NCO of less than 0.8% by weight, has an ICI melt viscosity of 6 to 20 poise at 175° C., and an equivalent weight in the range from about 280 to about 320.

The hydroxy containing polyesters that are used to provide the powder coating composition, when mixed with the blocked polyisocyanate prepolymer component, are polyesters which are well known to those skilled in the art. These hydroxy containing polyesters can be prepared in the usual manner by reacting one or more polyhydric alcohols having at least two hydroxyl groups with one or more dibasic acids, or their corresponding lower alkyl esters or anhydrides.

Typical polyhydric alcohols which can be used include ethylene glycol, glycerine, diethylene glycol, trimethylol propane, triethylol propane, trimethylol ethane, pentaerythritol, and neopentyl glycol.

Among the aromatic dibasic acids and anhydrides and their esters that can be used include phthalic acid or anhydride, terephthalic acid and isophthalic acid. Lower alkyl esters of these acids can be used as well.

Aliphatic diacids that can be used to prepare the polyesters include adipic acid, sebacic acid and succinic acid.

Preferred hydroxy containing polyesters which can be used with the 1,4 BIC or 1,3 BIC cross-linking agents to form the powdered coating composition have a glass transition temperature above 50° C., are readily flowable at from about 140° C. to about 180° C. and form low viscosity melts.

The systems according to the invention and the preparation of the reactive components are described in the following examples.

PREPARATION OF 1,4 BIC CROSS-LINKERS

EXAMPLE 1

To prepare the E-caprolactam blocked polyisocyanate component, under a nitrogen blanket, one mole of trimethylol propane was charged with agitation into a vessel containing 3.5 moles of 1,4 BIC and a dibutyl tin dilaurate catalyst forming 0.1% by weight of the reactants. The reactants were heated to 60° C. with mixing for 2 hours. After 2 hours the reactants were heated to 90° C. and the percent isocyanate groups (NCO) in the polyisocyanate product was 21% at room temperature. 4.0 moles of E-caprolactam were added at 90° C. with agitation in such a manner to keep the reaction temperature in the range from about 125° C. to about 150° C. The reaction is very exothermic and cooling is required. The E-caprolactam was added as fast as possible within the aforedescribed temperature ranges. The reaction is completed after approximately 2 hours when the percent isocyanate groups (NCO) are in the range from about 0.2 to about 0.8 percent by weight of the product.

The resulting blocked polyisocyanate product was characterized by gel permeation chromatography (GPC) molecular weight distribution to have 78 to 87% by weight polymer, 13 to 22% by weight monomer, free NCO group of less than 0.8% by weight and an ICI melt viscosity of 6 to 20 poise at 175° C.

EXAMPLE II

E-caprolactam blocked isocyanates were prepared in a "one shot" process by mixing one mole of trimethylol propane and 4.0 moles of E-caprolactam. The TMP-caprolactam component was mixed with 3.5 moles of 1,4 BIC under nitrogen. When the two components are mixed a sharp exotherm results. The resulting adduct was held at 350°-375° F. for 90 seconds and dropped into a cooling pan to cool. The final NCO content of the product was less than 0.8% by weight and had an ICI melt viscosity of 6 to 20 poise at 175° C.

Preparation of Hydroxy Containing Polyesters

A particularly suitable hydroxy containing polyester to be mixed with the blocked polyisocyanate prepolymer component is obtained by a preparation illustrated in the following Example.

EXAMPLE III

Neopentyl glycol (9.2 equivalents), cyclohexanedimethanol (4.6 equivalents), trimethylol propane (0.95 equivalents), terephthalic acid (13.02 equivalents) and dibutyl tin oxide, used as a catalyst (0.05 to 0.1% by weight based on the charge), are reacted at 230° C. (esterification temperature) to provide a hydroxy containing polyester resin having an acid value of 3, an equivalent weight of about 1000, and ICI melt viscosity at 200° C. of 15-20 poise.

Preparation of Powder Coatings

The 1,4 BIC or 1,3 BIC based polyisocyante cross-linking agents are mixed with hydroxy containing polyesters as are known in the art. A particularly suitable powder coating is obtained by a preparation illustrated in the following Example.

EXAMPLE IV

The following components were mixed in a high intensity blender at 1000 to 2000 RPM for about 2 minutes.

100 parts by weight of the hydroxy terminated polyester described in Example III having an equivalent weight of 1000;

32 parts by weight of 1,4 BIC cross-linking agent as obtained in Example I having an equivalent weight of 315;

1.5 parts by weight of a flow control agent L-5310 which is a product of Union Carbide Corporation, New York, New York;

1.5 parts by weight benzoin; and 92 parts by weight titanium dioxide pigment.

The resulting mixture was extruded at 80° C. in the feed zone and at 150° C. in the mixing zone in a Buss PR-46 extruder and ground to a fine powder. The above paint has 1.0:1.0 NCO/OH equivalent ratio and a pigment to binder ratio of 0.7:1. When this fine powder is electrostatically sprayed on steel panels and cured at 30 minutes at 340° F. for 10 minutes at 380° F., an excellent coating is produced which has the following film properties.

| Film Thickness | 1.5 to 2.0 mils |
| Gloss 60° F./20° F. | 95/70 |
| Impact Resistance Forward | 160 in. lbs. |
| Reverse | 160 in. lbs. |
| Pencil Hardness | H-2H |
| MEK resistance, double rubs | 100 |
| Flexibility, Mandrel ⅛ inch | Pass |
| Flexibility, T-bend on Aluminum | 0-1T |
| Flow | 7 to 8 |
| Gel Time at 40° F. (seconds) | 150 to 280 |

It should be understood that while certain preferred embodiments of the present invention have been illustrated and described, various modifications thereof will become apparent to those skilled in the art, and accordingly, the scope of the present invention should be defined only by the appended claims and equivalents thereof.

Various features of the invention are set forth in the following claims.

What is claimed is:

1. A coating composition which comprises a molar mixture of E-caprolactam blocked polyisocyanate and E-caprolactam blocked diisocyanate in a ratio in a range of about 1:0 to about 1:1.5,
   said blocked polyisocyanate comprising the reaction product of a polyhydric compound and a diisocyanate,
   said diisocyanate being selected from the group consisting of 1,4-bis(isocyanatomethyl)cyclohexane, 1,3-bis(isocyanatomethyl)cyclohexane and mixtures thereof,
   said polyhydric compound being selected from the group consisting of trimethylol propane, trimethylol ethane, glycerine, E-caprolactone, and mixtures thereof; and
   a film forming hydroxy containing polyester.

2. A coating composition as recited in claim 1 wherein said mixture has free NCO of less than 0.8 percent by weight and an ICI melt viscosity of about 6 to about 20 poise at 175° C.

3. A coating composition as recited in claim 1 wherein said polyester is a reaction product of neopentyl glycol, cyclohexandimethanol, trimethylol propane and terephthalic acid.

4. A coating composition as recited in claim 1 wherein said polyester has an ICI melt viscosity of about 15 to about 20 poise.

5. A coating composition as recited in claim 1 wherein said mixture of E-caprolactam blocked polyisocyanate and blocked diisocyanate has an equivalent weight in the range from about 280 to about 320.

6. A coating composition as recited in claim 5 wherein said mixture of E-caprolactam blocked polyisocyanate and blocked diisocyanate is the reaction product of about 3.5 moles diisocyanate, about one mole trimethylol propane and about 4 moles E-caprolactam.

7. A coating composition which comprises: an E-caprolactam blocked polyisocyanate which is the reaction product of from about 3.0 to about 4.5 moles of a diisocyanate selected from the group consisting of 1,4-bis(isocyanatomethyl)cyclohexane, 1,3-bis(isocyanatomethyl)cyclohexane and mixtures thereof, about 1.0 mole of polyhydric compound per mole of isocyanate group, and from about 3.0 to about 6.0 moles of E-caprolactam:
   said polyhydric compound being selected from the group consisting of trimethylol propane, trimethylol ethane, glycerine, E-caprolactone, and mixtures thereof; of
   a film forming hydroxy containing a polyester.

8. A method for producing a coating composition comprising:
   reacting a reaction mixture comprising
   from about 3.0 to about 4.5 moles of a diisocyanate selected from the group consisting of 1,4-bis(isocyanatomethyl)cyclohexane, 1,3-bis(isocyanatomethyl)cyclohexane and mixtures thereof,
   about 1 mole of a polyhydric compound per mole of isocyanate group, said polyhydric compound being selected from the group consisting of trimethylol propane, trimethylol ethane, glycerine, E-caprolactone, and mixtures thereof,
   and from about 3.0 to about 6.0 moles E-caprolactam to form a block polyisocyanate component;
   mixing said blocked polyisocyanate compound with a film forming hydroxy containing polyester.

* * * * *

UNITED STATES PATENT AND TRADEMARK OFFICE
CERTIFICATE OF CORRECTION

PATENT NO. : 4,395,529
DATED : July 26, 1983
INVENTOR(S) : K. A. Pai Panandiker, et al.

It is certified that error appears in the above-identified patent and that said Letters Patent is hereby corrected as shown below:

On the title page:

Primary Examiner - "H. S. Cockeran" should read ---H. S. Cockeram---.

In column 3, line 27, "EXAMPLE 1" should read ---EXAMPLE I---.

In column 4, line 44, "for" should read ---or---.

In column 6, line 15, Claim 7, "thereof; of" should read ---thereof; and---.

Signed and Sealed this

Eighteenth Day of October 1983

[SEAL]

Attest:

GERALD J. MOSSINGHOFF

Attesting Officer     Commissioner of Patents and Trademarks